United States Patent
D'Apuzzo et al.

(10) Patent No.: US 11,391,660 B2
(45) Date of Patent: Jul. 19, 2022

(54) BATCH PARTICLE SORTING

(71) Applicant: Hewlett-Packard Development Company, L.P., Spring, TX (US)

(72) Inventors: Fausto D'Apuzzo, Palo Alto, CA (US); Viktor Shkolnikov, Palo Alto, CA (US); Yang Lei, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/256,324

(22) PCT Filed: Oct. 1, 2018

(86) PCT No.: PCT/US2018/053725
§ 371 (c)(1),
(2) Date: Dec. 28, 2020

(87) PCT Pub. No.: WO2020/072031
PCT Pub. Date: Apr. 9, 2020

(65) Prior Publication Data
US 2021/0262913 A1    Aug. 26, 2021

(51) Int. Cl.
*G01N 15/02* (2006.01)
*G01N 15/14* (2006.01)
(Continued)

(52) U.S. Cl.
CPC ..... *G01N 15/0227* (2013.01); *G01N 15/1459* (2013.01); *G01N 15/1463* (2013.01);
(Continued)

(58) Field of Classification Search
CPC .......... G01N 15/0227; G01N 15/1459; G01N 15/1463; G01N 2015/0038;
(Continued)

(56) References Cited

U.S. PATENT DOCUMENTS 7,214,298 B2    5/2007    Spence et al.
9,964,968 B2 *  5/2018    Sharpe ............... G01N 15/1425
(Continued)

FOREIGN PATENT DOCUMENTS

| EP | 1757922 | 2/2007 |
| EP | 2577254 | 4/2013 |
| WO | WO-2011154042 | 12/2011 |

OTHER PUBLICATIONS

Carrissemoux, Caro, "Investigating cell sorting and analysis of the proprietary cell-BOCS platform", In Danish Physics Society Annual Meeting, 2016, 75 pgs.
(Continued)

*Primary Examiner* — Roy M Punnoose
(74) *Attorney, Agent, or Firm* — HP Inc. Patent Department

(57) ABSTRACT

A system and a method for the batch sorting of particles are provided. An example of a batch sorting system includes a microfluidic ejector, a flow channel fluidically coupled to the microfluidic ejector at one end, and a reservoir coupled to an opposite end of the flow channel from the microfluidic ejector. A counter is disposed in the flow channel upstream of the microfluidic ejector to count particles prior to ejection from the microfluidic ejector. An optical sensor is to image the flow channel. A controller is configured to locate a target particle in the flow channel based, at least in part, on the image and capture the target particle in a collection vessel based, at least in part, on a count from the counter.

15 Claims, 16 Drawing Sheets

(51) Int. Cl.
 *G06V 20/69* (2022.01)
 *G01N 15/00* (2006.01)
 *G01N 15/10* (2006.01)

(52) U.S. Cl.
 CPC ... *G06V 20/693* (2022.01); *G01N 2015/0038* (2013.01); *G01N 2015/1006* (2013.01); *G01N 2015/149* (2013.01); *G01N 2015/1488* (2013.01); *G01N 2015/1493* (2013.01)

(58) Field of Classification Search
 CPC ... G01N 2015/1006; G01N 2015/1488; G01N 2015/149; G01N 2015/1493; G01N 2015/1037; G01N 15/12; G01N 15/1429; G01N 15/1434; G06V 20/693
 USPC .......................................................... 356/335
 See application file for complete search history.

(56) References Cited

U.S. PATENT DOCUMENTS

| | | | |
|---|---|---|---|
| 9,976,973 B2* | 5/2018 | Watkins | G01N 33/56972 |
| 11,035,776 B2* | 6/2021 | Dembski | G01N 15/1425 |
| 2003/0106598 A1 | 6/2003 | Sekiguchi | |
| 2008/0261326 A1 | 10/2008 | Dudenhoefer et al. | |
| 2009/0035838 A1 | 2/2009 | Quake et al. | |
| 2011/0312081 A1* | 12/2011 | Azimi | C12Q 1/68 |
| | | | 422/509 |
| 2012/0143152 A1 | 6/2012 | Hunter et al. | |
| 2012/0220022 A1 | 8/2012 | Ehrlich et al. | |
| 2013/0149774 A1 | 6/2013 | Kim et al. | |
| 2014/0339446 A1 | 11/2014 | Yamamoto et al. | |
| 2014/0378352 A1 | 12/2014 | Daridon | |

OTHER PUBLICATIONS

Lin, et al., "Microfluidic cell counter/sorter utilizing multiple particle tracing technique and optically switching approach", Biomedical microdevices 10, No. 1 (2008), 55-63.

Riba, et al., "Label-free isolation and deposition of single bacterial cells from heterogeneous samples for clonal culturing", Scientific reports 6, No. 1 (2016): 1-9.

Yasuda, et al., "Non-destructive on-chip imaging flow cell-sorting system for on-chip cellomics", Microfluidics and Nanofluidics 14, No. 6 (2013): 907-931.

Yu, et al., "An integrated microfluidic device for the sorting of yeast cells using image processing", Scientific reports 8, No. 1 (2018): 1-12.

* cited by examiner

900

1400

BATCH PARTICLE SORTING

BACKGROUND

Currently, Florescence Activated Cell Sorting (FACS) is a primary technique for sorting cells in research laboratories. In FACS, a vibrating flow cell is used to create a line of droplets. As the droplets exit the vibrating flow cell, optical systems are used to collect averaged optical information, such as average fluorescence and scattering of the cells in the droplets. The droplets are electrically charged and deflected into different collection tubes based on the electrical charge.

DESCRIPTION OF THE DRAWINGS

Certain exemplary embodiments are described in the following detailed description and in reference to the drawings, in which.

DETAILED DESCRIPTION

Figure 1:
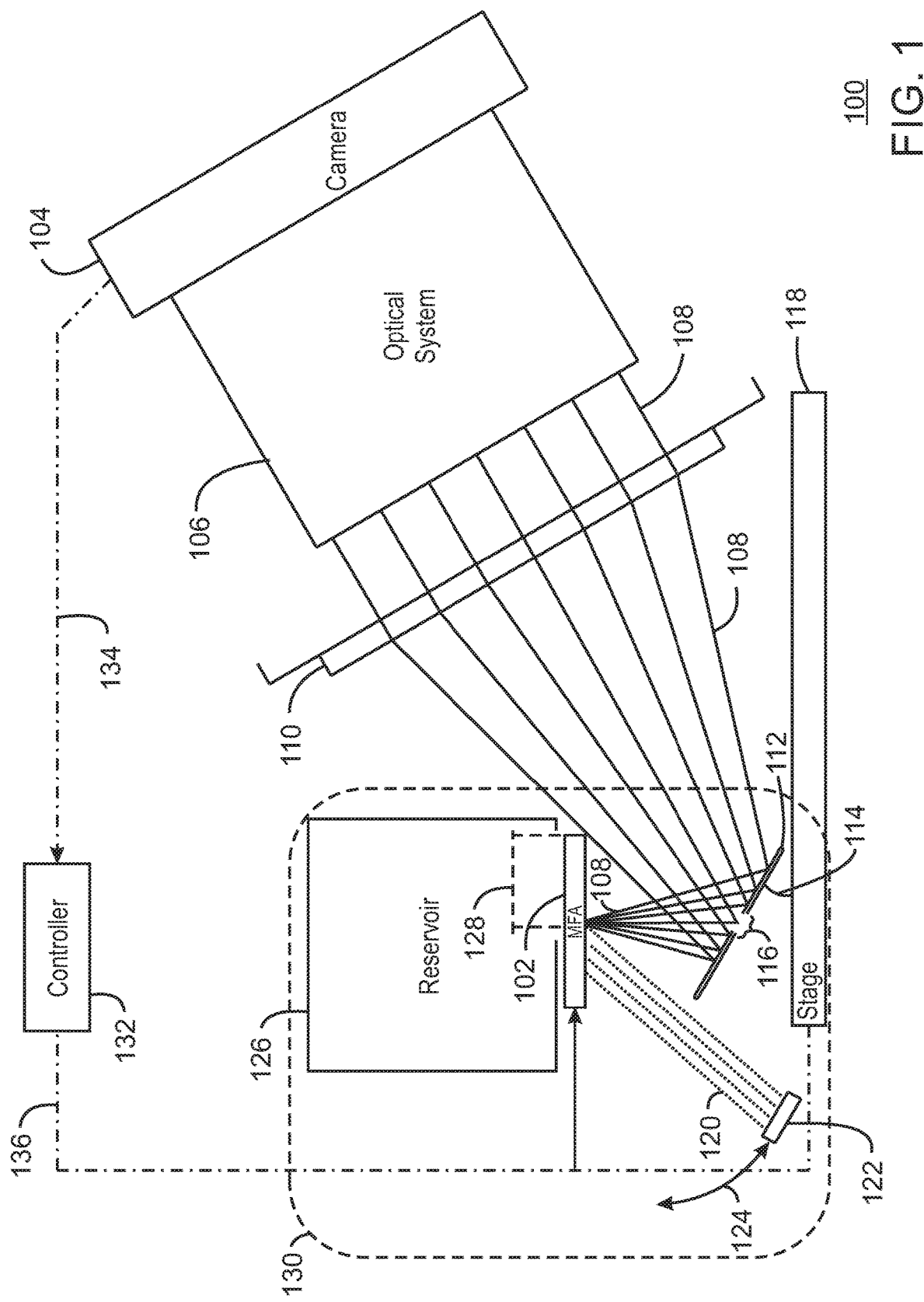
FIG. 1 is a drawing of a batch sorting system that uses a die including a microfluidic ejector array, in accordance with examples.

Current FACS systems are complex, expensive, and need specialized personnel to maintain and operate. Accordingly, simpler systems would be valuable. Systems and a method are disclosed herein for optical sorting of particles, such as cells, via non-destructive and continuous optical monitoring of an array of microfluidic ejectors. The microfluidic ejectors are similar to ejectors used in ink-jet printers and may include thermally actuated ejectors or piezoelectric cell ejectors.

The system includes a reservoir with a fluid solution containing particles which differ by shape, fluorescence or size, or other properties that can be optically discriminated. In some examples, the particles are cells. In other examples, the particles are nano-composites, such as cadmium sulfide spheres used for televisions and monitors. The reservoir feeds flow channels that feed nozzles for microfluidic ejectors that are independently controlled. An imaging system, such as a microscope, monitors the feed to the ejectors, for example, in the flow channels leading up to the ejectors, without interfering with ejected material reaching a target destination, such as a well in a multi-well plate, a collection vessel, or other container. The imaging system includes an annular mirror, for example, having a central aperture, which is placed in the optical path to focus the imaging system on the microfluidic ejectors. Ejected droplets containing the target particles pass through the aperture into the target destination.

Targeted particles are selected by a controller that processes the images collected by the optical system to identify regions of interest within the flow channels that hold particles. Counts are assigned to the particles starting from the final particle before the nozzle and moving back to the feed to the flow channel from the reservoir.

The microfluidic ejectors are then actuated to eject particles, while counting the number of particles ejected. When the count indicates that a target particle has been reached, the target particle is dispensed into a capture container by actuating the microfluidic ejectors in tandem with other devices. In one example, an x-y stage supporting a multiwell plate is moved to place a well under the microfluidic ejector to capture a droplet holding the targeted particle. In another example, the x-y stage is moved to move a capture vessel under the microfluidic ejector. In some examples, an ejected droplet may be charged after leaving the nozzle. An electrical field that is applied in an orthogonal direction to the nominal trajectory of the droplet then deflects the droplet towards a target location, such as a capture vessel. The electrodes can be integrated onto the surface of the annular mirror. In some examples, the electrodes are plates placed below the mirror. The two techniques may be used in tandem, for example, an x-y stage moves a group of collection vessels under the microfluidic ejector, and an electric field is used to steer the droplet into the targeted collection vessel.

After the capture of the targeted particle, the x-y stage may be moved to place a waste container under the microfluidic ejectors. The sequential firing of the microfluidic ejectors is then resumed, while continuing to count particles to make sure that other targeted particles are captured.

FIG. 1 is a drawing of a batch sorting system 100 that uses a die 102 including a microfluidic ejector array, in accordance with examples. The batch sorting system 100 has an optical sensor, such as a camera 104, which may include a charge coupled device (CCD), to collect images of the die 102. The camera 104, or any other imaging devices mentioned herein, may include a high frame rate imaging system, a CCD, a diode array, a multichannel spectrophotometer, or any number of other optical sensors, such as photomultiplier tubes (PMT), phototransistors, or photodiodes among others. An optical system 106 is used to collect the light 108 arriving from the die 102 and focus it on the sensor of the camera 104.

As described herein, in some examples, the microfluidic ejectors of the die 102 use thermal resistors to eject fluids from nozzles by heating fluid at the back of the nozzles to create bubbles that force fluid from the nozzles. In other examples, the microfluidic ejectors use piezoelectric cells to force fluid from the nozzles. As described with respect to FIG. 4, the die 102 may include transparent channels leading to each nozzle, wherein the width of the transparent channels may be selected to force particles, such as cells, into a substantially single file line. Accordingly, imaging the die 102 images the line of particles in the flow channel.

The optical system 106 may include lenses, filters, diffraction gratings, and other devices to focus the incoming light 108 on a sensor array in the camera 104. In some examples, the optical system 106 includes a filter that allows a narrow frequency band of the incoming light 108 to reach the camera 104. In various examples, the optical system 106 includes a monochromator that is adjustable to different frequencies of the incoming light 108 for operation. In other examples, the optical system 106 divides the incoming light 108 into different channels, each of which are sent to a different sensor within the camera 104. This may provide a multispectral analysis of the incoming light 108, for example, as described with respect to FIG. 6. In various examples, the optical system 106 and camera 104 are used to perform brightfield, dark-field, florescence, hyperspectral, and other optical analyses.

A focusing lens 110 is used to focus the optical system 106 on the incoming light 108 coming from the die 102. The focusing lens 110 may be a single lens, a group of lenses, or other optical apparatus. In an example, the focusing lens 110 is a Fresnel lens, providing a wide area lens without adding significant complexity. In other examples, the focusing lens 110 is integrated with the optical system and includes multiple elements, such as a microscope objective.

An annular mirror 112 is used to direct the light from the die 102 towards the focusing lens 110. The annular mirror 112 is placed at an angle 114 that is appropriate for the light collection, such as 30°, 45°, and the like. In an example, the angle 114 is 45°. An opening 116 in the annular mirror 112 is positioned directly under the die 102 to allow droplets from the microfluidic ejectors to pass through to a stage 118 located below the annular mirror 112. In various examples, the opening 116 is about 0.5 mm in diameter, about 1 mm in diameter, or about 2 mm in diameter, among others. In other examples, the opening 116 is generally oblong, for example, an oval that is about 1 mm across and about 3 mm long, or about 0.5 mm across and about 1.5 mm long, and aligned with the die 102.

The stage 118 may be moved to place different collection vessels under the die 102, such as individual wells on a multi-well plate, a waste container, a micro sample tube, or any combinations thereof. In some examples, the stage 118 is an x-y translation stage, or x-y stage, which can move a multiwell plate in an x-y grid to align a well under a microfluidic ejector the die 102. In other examples, the stage 118 is a linear translation stage that can move a micro sample tube under a microfluidic ejector in the die 102 for collection or disposal of cells.

For imaging, the die 102 may be illuminated using any number of different techniques. In some examples, illumination 120 from a light source 122 is directed towards the die 102. The illumination 120 may be focused on the die 102, or broadly illuminate the base of the cartridge. In various examples, this is adjusted to select whether a brightfield or a dark-field imaging technique is used for the imaging. Further, the light source 122 may be moved to different locations relative to the die 102, as indicated by arrow 124. In other examples, the optical system 106 may include a co-linear illumination system as described with respect to FIG. 3. In some examples, the light source 122 is a laser, such as a laser photodiode or an array of laser photodiodes with a distribution of different peak wavelengths.

A reservoir 126 holds a fluid that includes the particles, or cells in one example, of interest. The particles differ by a shape, florescence or other spectroscopic properties, size, or other properties that may be determined by imaging. The reservoir 126 feeds into a chamber 128 that feeds the die 102. In one example, the chamber 128 is around 6 mm in size and is fluidically coupled to the nozzles of the die 102.

Figure 5:
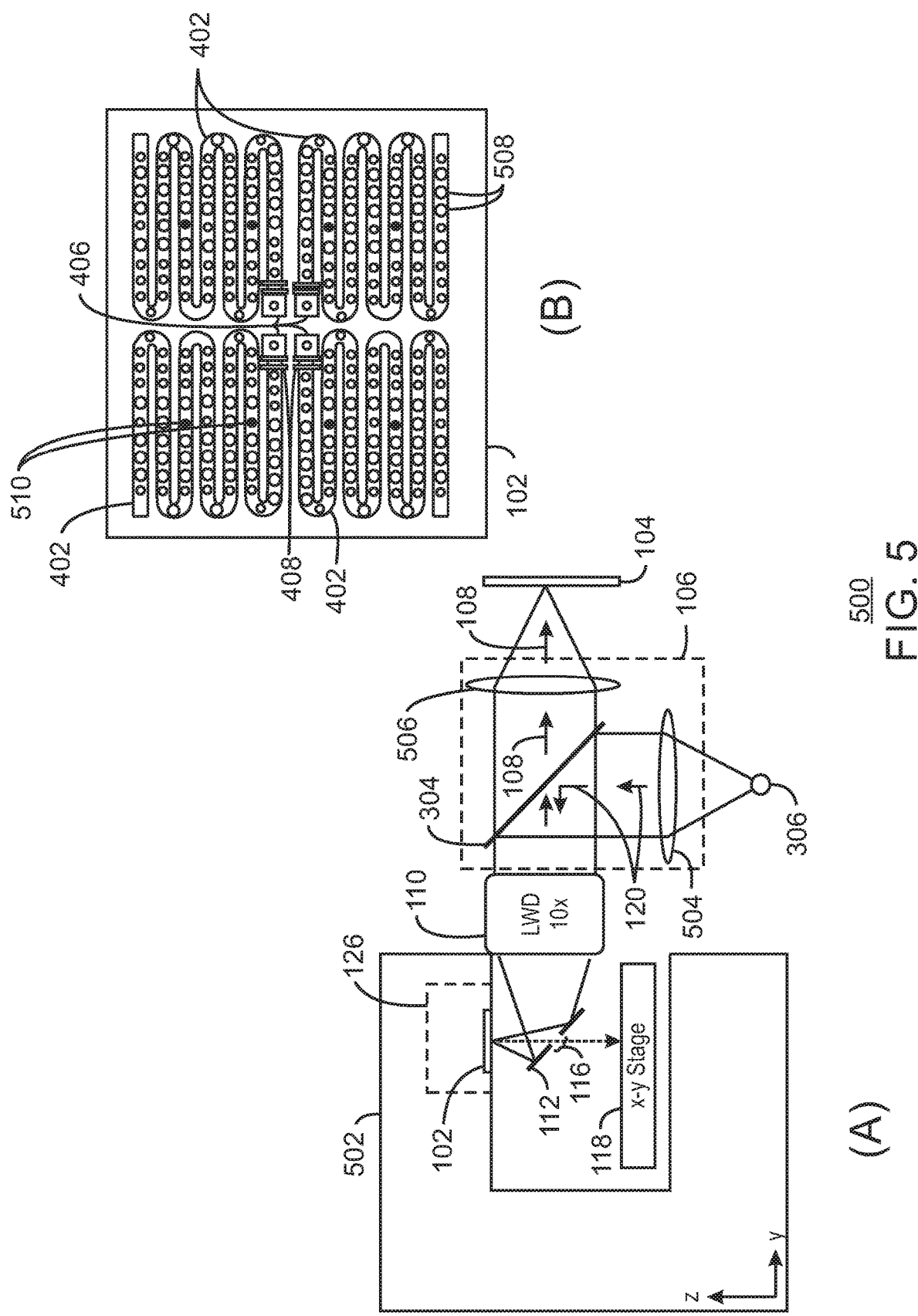
FIGS. 5(A) and 5(B) are drawings of an integrated particle sorting unit (PSU) that may use the die of FIG. 4 to implement batch particle sorting, in accordance with examples.

The reservoir 126, chamber 128, die 102, stage 118, and light source 122 may form a particle sorting unit (PSU) 130. In some examples, the PSU 130 is constructed into an integrated unit for easier handling, for example, as described with respect to FIG. 5.

The batch sorting system 100 includes a controller 132 that is coupled to the camera 104 through an image data link 134. The controller 132 may analyze images from the camera 104 to identify target particles, such as specific types of cells, proximate to a microfluidic ejector in the die 102, for example, in a flow channel leading to a nozzle for a microfluidic ejector. The controller 132 is also coupled through control links 136 to the microfluidic ejectors of the die 102, and to motors controlling the stage 118. In an example, the controller 132 identifies particles in a flow channel leading to a microfluidic ejector and assigns a count to each particle starting from the nozzle and increasing.

The controller 132 then activates the microfluidic ejectors of the die 102 to sequentially eject cells from each microfluidic ejector, while counting the particles ejected. When the count indicates that the next particle to be ejected is a target particle, the controller 132 uses the motors of the stage 118 to move a collection well under the microfluidic ejector. The controller 132 then activates the microfluidic ejector to eject the target particle into the collection well. The controller 132 then moves a different container, such as a waste container, under the microfluidic ejector to capture non-target particles. The procedures for capturing these particles are discussed in greater detail with respect to FIGS. 10, 11, 13, and 14. The controller 132 itself is discussed in greater detail with respect to FIG. 7.

The optical system 106, camera 104, and annular mirror 112 form an optical device that is used to probe the materials in the die 102. In various examples, the optical device is a microscope, fluorimeter, a particle size analyzer, an image recognition system, or a combination thereof.

Figure 2:
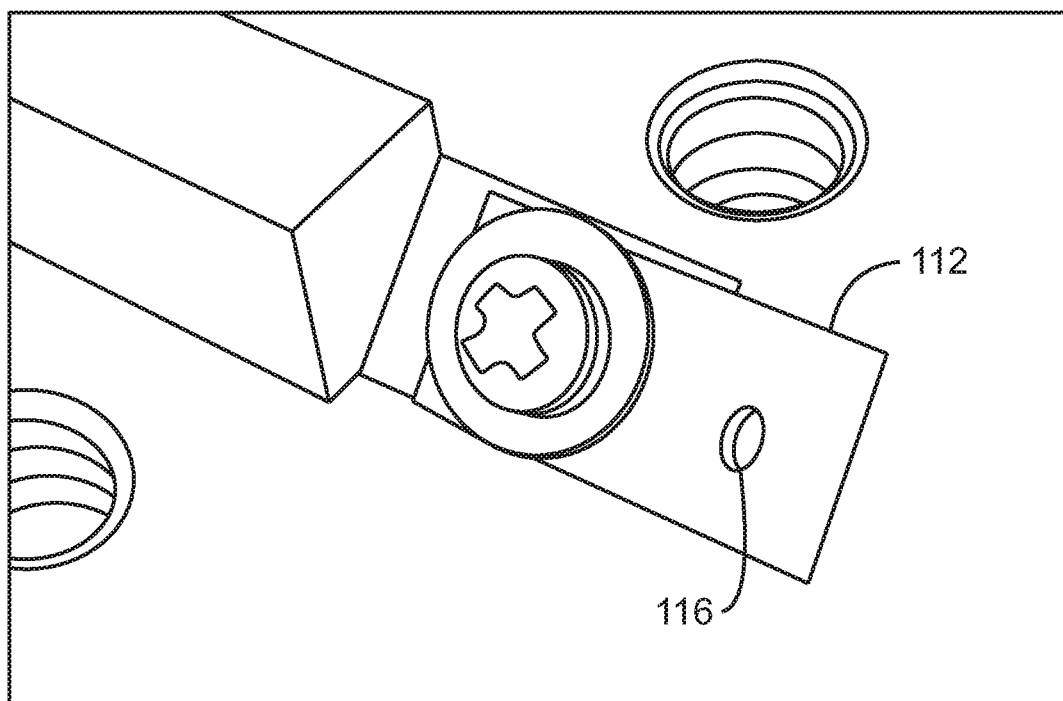
FIG. 2 is a drawing of an annular mirror that may be used in the batch sorting system, in accordance with examples.

FIG. 2 is a drawing 200 of an annular mirror 112 that may be used in the batch sorting system 100, in accordance with examples. Like numbered items are as described with respect to FIG. 1. The drawing 200 shows the opening 116 through which the droplet ejected by a microfluidic ejector passes to reach a target container.

Figure 3:
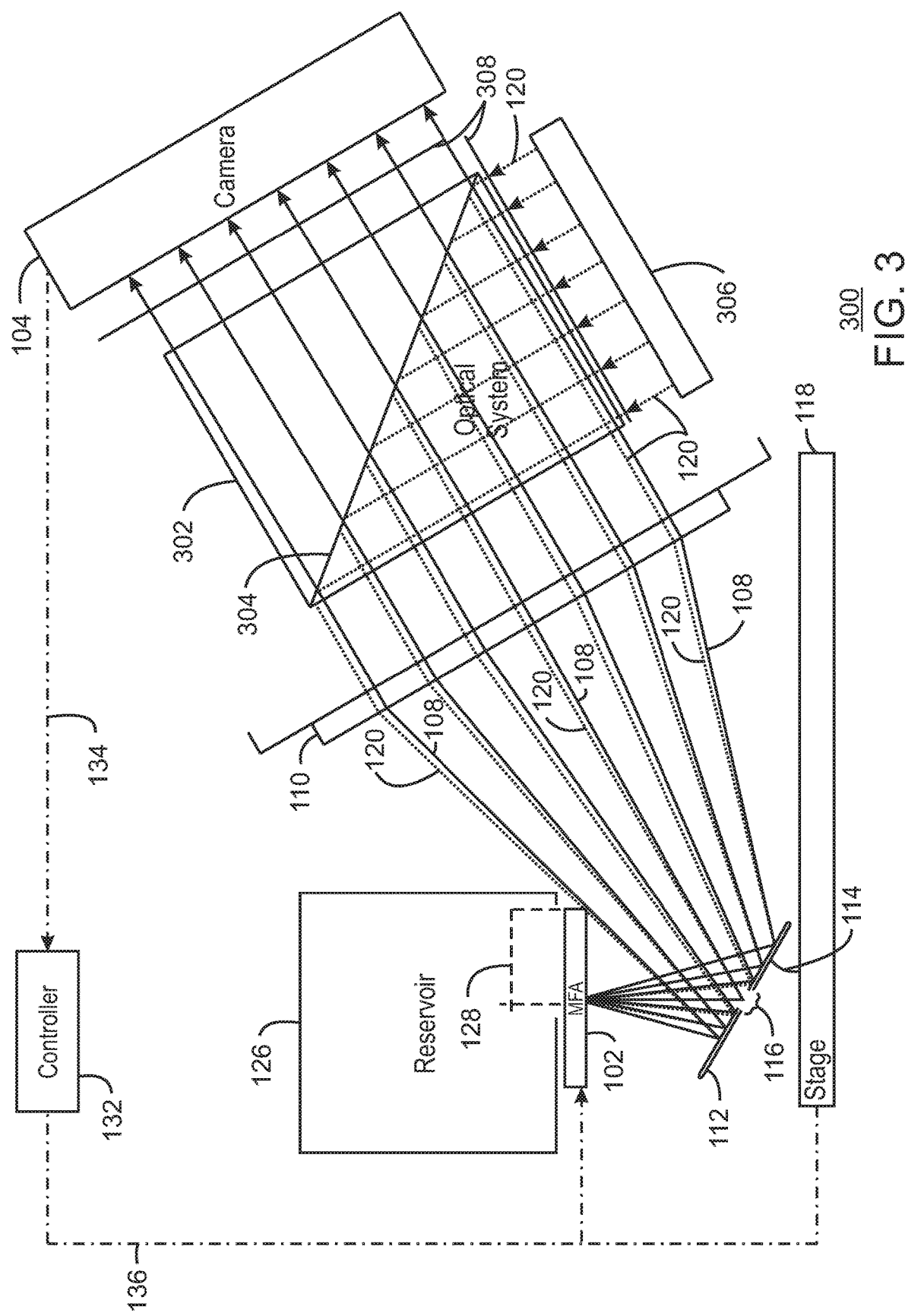
FIG. 3 is a drawing of another batch sorting system in which an illuminating optical system provides co-linear illumination with light returned to the camera, in accordance with examples.

FIG. 3 is a drawing of another batch sorting system 300 in which an illuminating optical system 302 provides co-linear illumination with incoming light 108 returned to the camera 104, in accordance with examples. Like numbered items are as described with respect to FIG. 1. In this example, the illuminating optical system 302 includes a reflective surface 304, such as a partially silvered mirror or a prism acting as a beam splitter, which directs the illumination 120 from a co-linear light source 306 through the focusing lens 110 onto the annular mirror 112 to illuminate the die 102. The co-linear light source 306 may include any number of sources of illumination. In an example, the co-linear light source 306 includes an array of light emitting diodes. In another example, the co-linear light source 306 includes a laser array including laser diodes of different frequencies and optics to expand the beam and direct them linearly into the illuminating optical system 302.

Incoming light 108 returning from the die 102 passes through the reflective surface 304 and is captured by the camera 104. To enhance the amount of incoming light 108 detected by the camera 104, filters 308 may be placed between the co-linear light source 306 and the illuminating optical system 302 and between the illuminating optical system 302 and the camera 104. In an example, the filters 308 are polarizing filters that are placed perpendicular to each other. In another example, the filters 308 are at an excitation band, such as a 50 nm bandpass filter centered on a wavelength of about 320 nm, between the co-linear light source 306 and the illuminating optical system 302, and at an emission band, such as a 50 nm bandpass filter centered on a wavelength of about 450 nm, between the illuminating optical system 302 and the camera 104.

In an example of the batch sorting system 300, the optical system is a bright field microscope, which includes a long working-distance microscope objective, for example, as focusing lens 110. In this example a beam splitter, functioning as reflective surface 304, directs the illumination 120 from a fiber-coupled light source, such as a halogen lamp, toward the focusing lens 110, functioning as the co-linear light source 306. A light condenser element, such as a focusing lens, may be placed between the beam splitter and the camera 104, along with a tube lens, to focus light on the camera 104.

Figure 4:
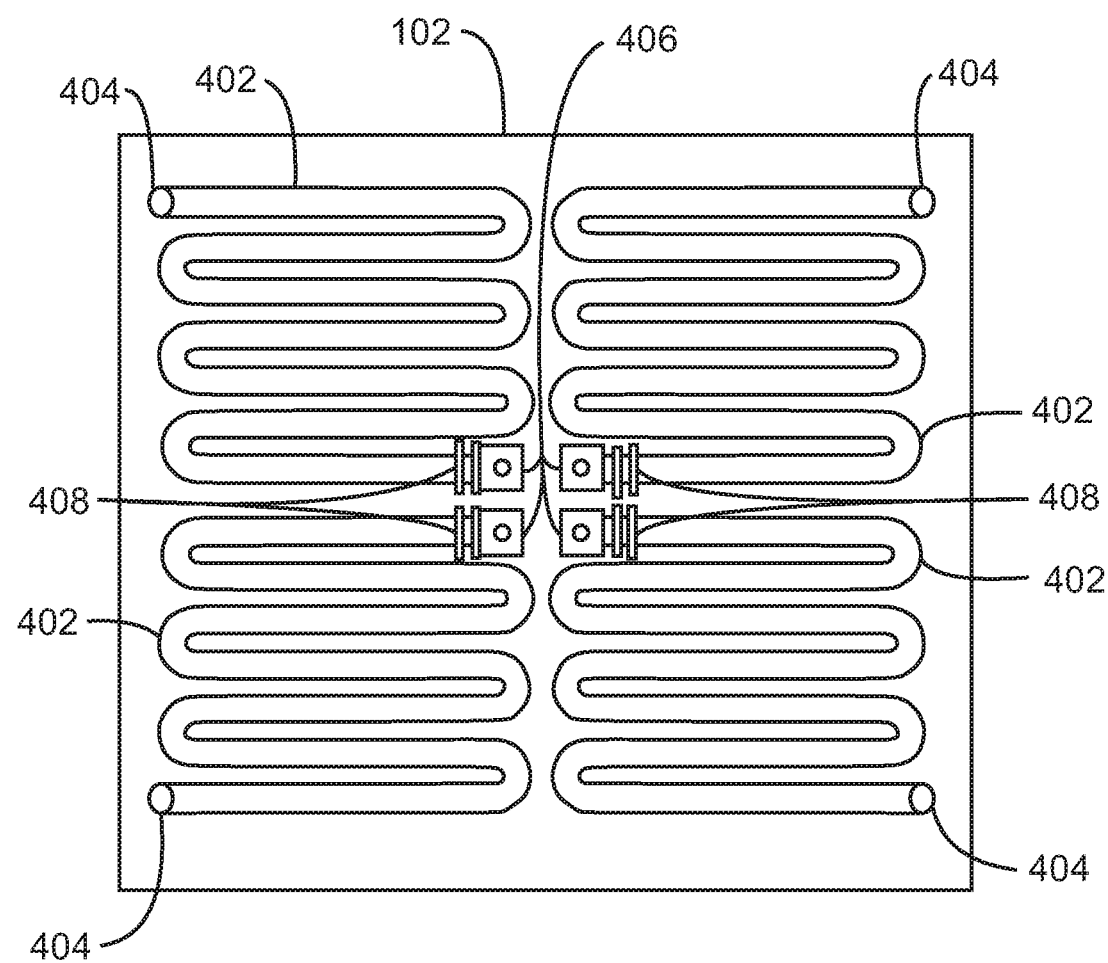
FIG. 4 is a drawing of a die that may be used for batch particle sorting, in accordance with examples.

FIG. 4 is a drawing of a die 102 that may be used for batch particle sorting, in accordance with examples. The die 102 may include a number of flow channels 402 each fluidically coupling to a feed hole 404 from a reservoir 126 (FIG. 1) to a nozzle 406. In various examples, the die 102 includes two, four, 10, or more, flow channels depending on the number of particles each flow channel 402 is to hold. It can be understood that the particles to be sorted may include cells, nanocomposites, such as CdS nanospheres, or any number of other materials. Accordingly, any reference to cells in examples should be interpreted more broadly to include any sort of particles.

The width of each flow channel 402 may be selected to constrain larger particles into a single line, for example, constraining cells such as circulating tumor cells (CTCs), white blood cells, and other larger cells between the walls. Other cells, such as smaller red blood cells, bacterial cells, and the like, may be in clusters. In some examples, the flow channel 402 is greater than about 7.5 micrometers (µm) in width. In other examples, the flow channel 402 is greater than about 10 µm in width, or greater than about 15 µm in width, or greater than about 20 µm in width. The size of the flow channel 402 selected depends on the size of the larger particles that are expected to be encountered in the batch sorting procedure.

Each flow channel 402 terminates in a nozzle 406 for a microfluidic ejector. Just prior to the nozzle 406, each flow channel 402 has a Coulter counter 408 for electrochemically counting cells as they passed from the flow channel 402 into the nozzle 406. Generally, the Coulter counter 408 has an upstream electrode and a downstream electrode, wherein the impedance between the electrodes changes when a cell or particle enters the volume between the electrodes. In some examples, the Coulter counter includes a microchannel separating the upstream electrode from the downstream electrode. As a particle, such as a cell, flows through the microchannel, a transient drop may be detected in the current flow between the electrodes. In other examples, different technologies, such as optical detection, may be used to count the particles ejected.

Each nozzle 406 has an underlying microfluidic ejector that, when activated, ejects a droplet from the nozzle 406. As new material flows from the flow channel 402 into the nozzle 406, the Coulter counter 408 counts the particle that crosses the Coulter counter 408 into the nozzle 406. In some examples, the microfluidic ejector is a thermal resistor that, when activated, heats the liquid in the nozzle 406 forming a bubble that forces a droplet out of the nozzle 406. In other examples, the microfluidic ejector is a piezoelectric actuator that, when activated, physically ejects a droplet out of the nozzle 406.

The die 102 may be formed by any number of different techniques, including chemical etching, chemical deposition, molding, or machining, among others. In an example, the die 102 is a single block of silicon formed over the microfluidic ejectors. A mask is placed over the silicon to delineate the flow channels 402, which is then vapor or plasma etched to form the flow channels 402. In another example, a polymer layer, such as a polycarbonate, a polyacrylic, or the like, is formed over the circuitry of the microfluidic ejectors. The flow channels 402 are then molded into the polymer layer using a positive mold that is pushed into the polymer layer. In either of these examples, a cap layer is formed over the flow channel 402. The cap layer is transparent to the frequencies of light used to identify and count cells that are in the flow channel 402, such as a layer of SU-8. In an example, the cap layer is transparent to ultraviolet light and visible light to enable fluorescence spectroscopy of the cells. In other examples, the cap layer is only transparent to visible light, for example, for direct imaging of cells.

FIGS. 5(A) and 5(B) are drawings of an integrated particle sorting unit (PSU) 500 that may use the die 102 of FIG. 4 to implement batch particle sorting, in accordance with examples. Like numbered items are as described with respect to FIGS. 1, 3, and 4. In this example, the die 102 is mounted in the integrated PSU 502. The optical system 106 includes an illumination lens 504 to collate the illumination 120 from the co-linear light source 306. The focusing lens 506 focuses the incoming light 108, collected from the die 102 by the imaging optics, on the camera 104.

An initial image is collected of the die 102, and the cells 508 in each flow channel 402, as shown in FIG. 5(B), are located in a region of interest, identified as a target or non-target cell, and assigned a count. As the microfluidic ejectors powering each nozzle 406 are fired, cells 508 are pulled forward through the flow channel 402. The Coulter counter 408 for each nozzle 406 counts the cells as they are ejected from the nozzle 406. When the count indicates that previously identified target cells 510 are in a nozzle 406, the stage 118 is moved to place a collection vessel underneath the microfluidic ejector in the die 102 that is holding the target cell 510. The microfluidic ejector is then fired to capture the target cell 510.

Once the count indicates that all cells 508 in the initial image have been ejected, another image may be collected and analyzed to prepare for capturing another set of target cells 510. During the sequential firing of the microfluidic ejectors, additional images may be captured to ensure that the process is operating correctly. The system is not limited to a single image capture device such as camera 104, but may use multiple image capture devices to analyze the image at different spectral frequencies.

The PSU 500 may use any number of optical configurations for the batch cell sorting process. In one example, the die 102 is about 2.5 cm$^2$ with a field of view of approximately 1 mm$^2$. The focusing objective in this example is about 10 times to allow the capture of about 1000 particles or cells in the view.

In various examples, the camera has a brightfield integration time of 1 ms and a fluorescence integration time of 10 ms. The frame rate is greater than about 30 frames per second (fps), a resolution greater than about 500 pixels per particle or cell, and an image size greater than about 1920×1080 pixels (HD), resulting in an image size of about 2 to 4 megabytes.

In some examples, the die has 10 nozzles in the 1 mm$^2$ die face and a firing frequency of 10 kHz. This provides a system performance with a throughput of about 100 particles per second to 50,000 particles per second. The range on the processing time is from about 5 minutes, for one target particle in every 106 particles, to about 9 hours for one target particle in every 10M particles. This assumes that imaging takes about 10 ms, processing takes about 10 ms, printing takes about 10 ms, and moving a stage to a capture container takes about 300 ms, and about 1 billion particles are being sorted.

Figure 6:
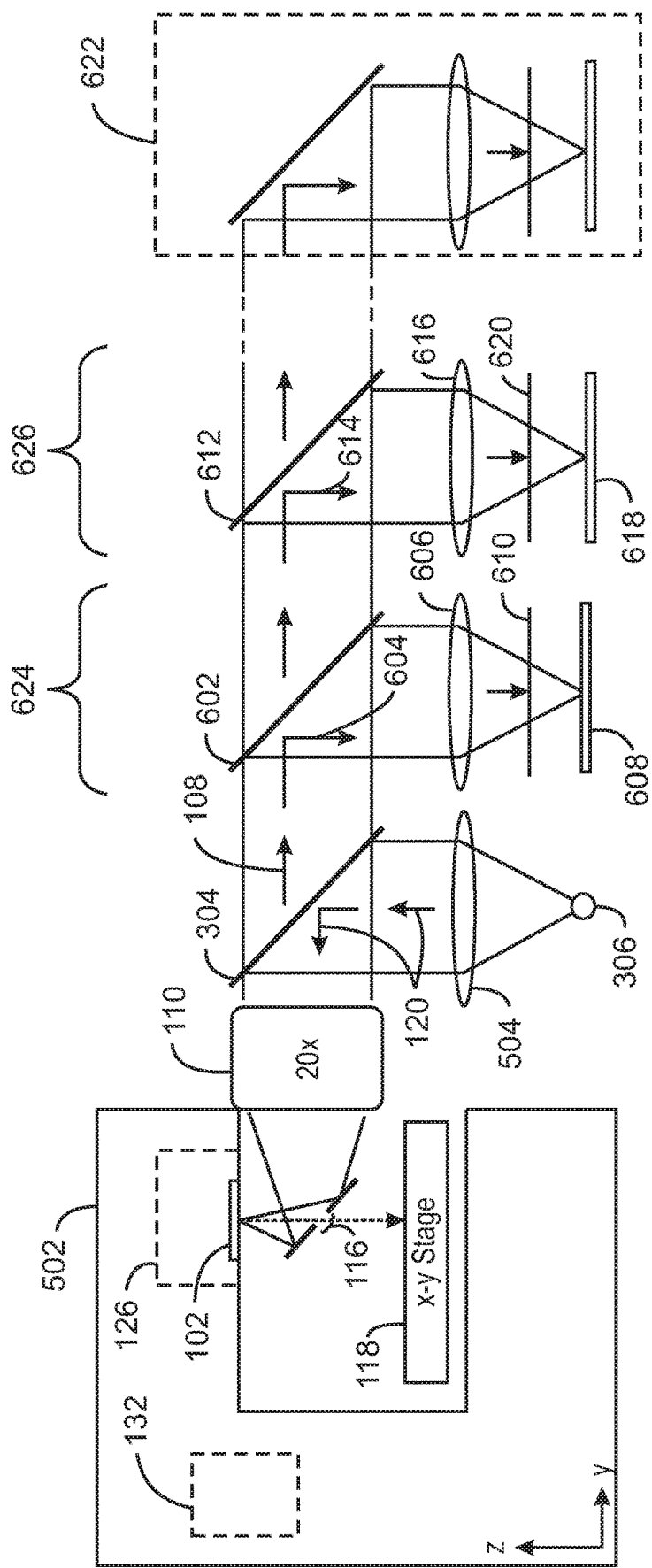
FIG. 6 is a drawing of a system that may use multiple optical detectors to analyze images for a batch particle sorting method, in accordance with examples.

FIG. 6 is a drawing of a system 600 that uses multiple optical detectors to analyze images for a batch particle sorting method, in accordance with examples. Like numbered items are as described with respect to FIGS. 1, 3, 4, and 5. In this example, incoming light 108, collected from the imaging of the die 102, may be imaged by a sequence of detectors. For example, a first beam splitter 602 may send a portion 604 of the incoming light 108 through a first focusing lens 606. The first focusing lens 606 focuses the portion 604 on a light collector, such as a first charge-coupled device (CCD) 608. A first filter 610, such as a narrow bandpass filter, may be used to isolate wavelengths for the imaging. In some examples, the first beam splitter 602 has a dichroic coating that reflects a frequency range, and allows light outside of that frequency range to pass through. In this example, the first filter 610 may not be used.

Further optical detectors may be used to collect other ranges of light frequencies. For example, a second beam splitter 612 directs another portion 614 of the incoming light 108 to a second focusing lens 616. The second focusing lens 616 focuses the portion 614 on a second CCD 618. A second filter 620 may be used to isolate wavelengths for the imaging. As for the first beam splitter 602, the second beam splitter 612 may use a dichroic coating to reflect a specific frequency range, and the second filter 620 may not be used.

Depending on the losses at the reflective surface 304 of each of the beam splitters 602 and 612, further optical detection systems 622 may be added. In an example, the first optical detection system 624 is used to capture a visible light image of the die 102, for example, to determine particle or cell sizes. In an example, the second optical system 626 is used to detect emission at a first wavelength of light, for example, where the first wavelength of light is the lowest energy, or most difficult to detect. This allows the first wavelength of light to be detected before significant losses from the beam splitters. In this example, succeeding optical detection systems 622 may capture emission at other wavelengths of light, for example, in sequence of difficulty of detection, wherein more difficult to detect wavelengths of light travel through fewer beam splitters.

Figure 7:
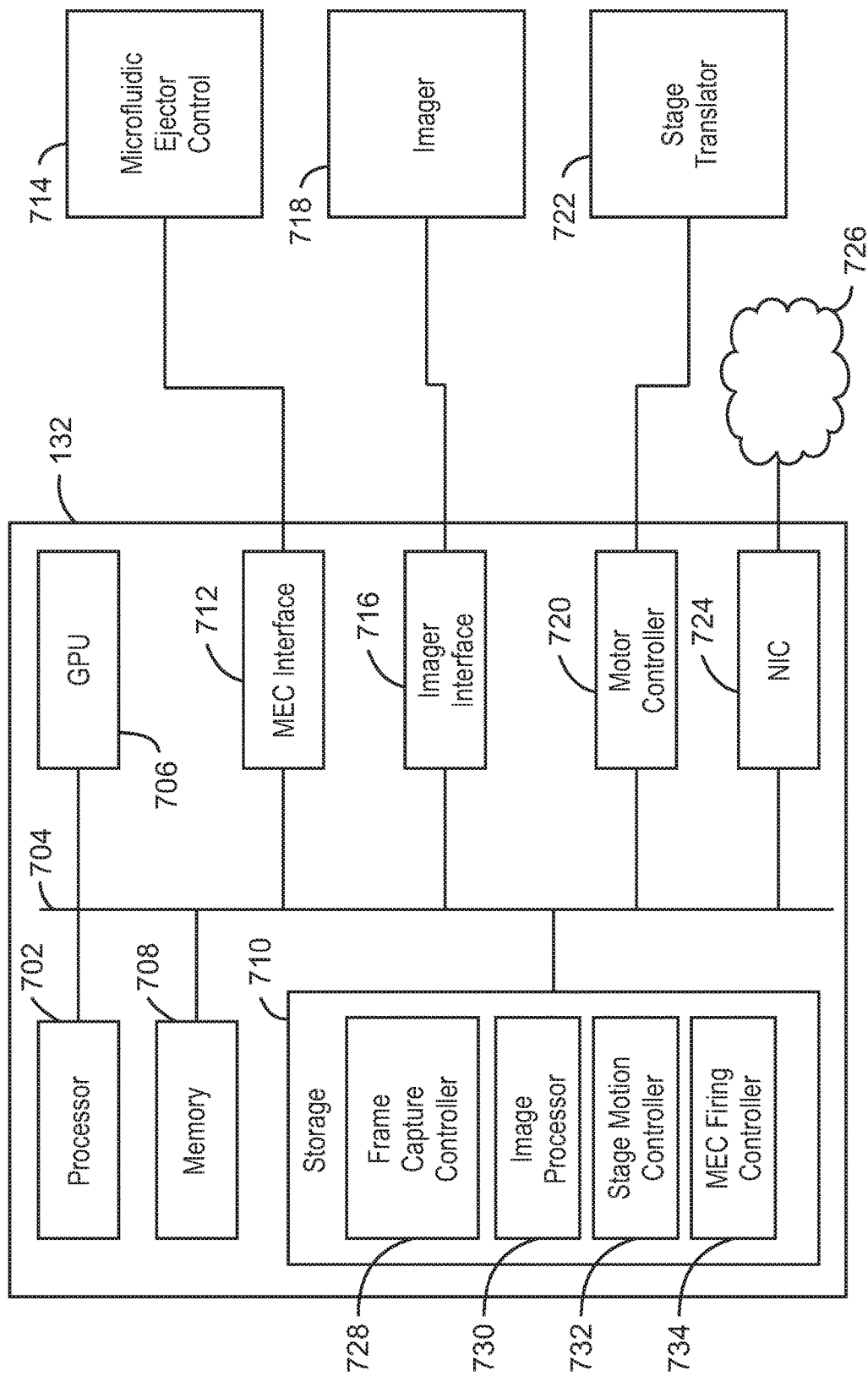
FIG. 7 is a drawing of a controller to perform batch particle sorting, in accordance with examples.

FIG. 7 is a drawing of a controller 132 to perform batch particle sorting, in accordance with examples. The controller 132 includes a central processing unit (CPU) 702 that executes stored instructions. In various examples, the CPU 702 is a microprocessor, a system on a chip (SoC), a single core processor, a dual core processor, a multicore processor, a number of independent processors, a computing cluster, and the like.

The CPU 702 is communicatively coupled to other devices in the controller 132 through a bus 704. The bus 704 may include a peripheral component interconnect (PCI) bus, and industry standard architecture (EISA) bus, a PCI express (PCIe) bus, high-performance interconnects, or a proprietary bus, such as used on a system on a chip (SoC).

The bus 704 may couple the processor to a graphics processing unit (GPU) 706, such as units available from Nvidia, Intel, AMD, ATI, and others. In some examples, a floating-point gate array (FPGA) is used to process images in addition to or instead of the GPU 706. If present, the GPU 706 provides graphical processing capabilities to enable the high-speed processing of images from the camera. For example, the data rate for transferring image data from the camera is less than about 1 Gb per second using USB 3.1, with a processing time of less than about 10 µs per cell identification using an FPGA. The GPU 706 may be configured to perform any number of graphics operations. For example, the GPU 706 may be configured to pre-process the plurality of image frames by isolating the region of interest, downscaling, reducing noise, correcting lighting, and the like. In examples that use only spectroscopic techniques, the GPU 706 may not be present.

A memory device 708 and a storage device 710 may be coupled to the CPU 702 through the bus 704. In some examples, the memory device 708 and the storage device 710 are a single unit, e.g., with a contiguous address space accessible by the CPU 702. The memory device 708 holds operational code, data, settings, and other information used by the CPU 702 for the control. In various embodiments, the memory device 708 includes random access memory (RAM), such as static RAM (SRAM), dynamic RAM (DRAM), zero capacitor RAM, embedded DRAM (eDRAM), extended data out RAM (EDO RAM), double data rate RAM (DDR RAM), resistive RAM (RRAM), and parameter RAM (PRAM), among others.

The storage device 710 is used to hold longer-term data, such as stored programs, an operating system, and other code blocks used to implement the functionality of the cell sorting system. In various examples, the storage device 710 includes non-volatile storage devices, such as a solid-state drive, a hard drive, a tape drive, an optical drive, a flash drive, an array of drives, or any combinations thereof. In some examples, the storage device 710 includes non-volatile memory, such as non-volatile RAM (NVRAM), battery backed up DRAM, flash memory, and the like. In some examples, the storage device 710 includes read only memory (ROM), such as mask ROM, programmable ROM (PROM), erasable programmable ROM (EPROM), and electrically erasable programmable ROM (EEPROM).

A number of interface devices may be coupled to the CPU 702 through the bus 704. In various examples, the interface devices include a microfluidic ejector controller (MEC) interface 712, an imager interface 716, and a motor controller 720, among others.

The MEC interface 712 couples the controller 132 to a microfluidic ejector controller 714. The MEC interface 712 directs the microfluidic ejector controller 714 to fire microfluidic ejectors in a microfluidic ejector array, either individually or as a group. As described herein, the firing is performed in response to counts of cell or particle types, based, at least in part, on the identification of the cell or particle types.

The imager interface 716 couples the controller 132 to an imager 718. The imager interface 716 may be a high-speed serial or parallel interface, such as a PCIe interface, a USB 3.0 interface, a FireWire interface, and the like. In various examples, the imager 718 is a high frame-rate camera configured to transfer data and receive control signals over the high-speed interface. In some examples, the imager 718 is a multiple CCD device imaging at different wavelengths.

The motor controller 720 couples the controller 132 to a stage translator 722. The motor controller 720 may be a stepper motor controller or a servo motor controller, among others. The stage translator 722 includes motors, sensors, or both coupled to the motor controller 720 to move the stage, and attached collection vessels, under a microfluidic ejector.

A network interface controller (NIC) 724 may be used to couple the controller 132 to a network 726. In various examples, this allows for the transfer of control information to the controller 132 and data from the controller 132 to units on the network 726. The network 726 may be a wide area network (WAN), a local area network (LAN), or the Internet, among others. In some examples, the NIC 724 connects the controller 132 to a cluster computing network, or other high-speed processing system on the network 726, where image processing and data storage occur. This may be used by controllers 132 that do not include a GPU 706 for graphical processing. In some examples, a dedicated human machine interface (HMI) (not shown) may be included in the controller 132 for local control of the systems. The HMI may include a display and keyboard.

The storage device 710 may include code blocks used to implement the functionality of the batch sorting system. In various examples, the code blocks include a frame capture controller 728 that is used to capture a frame, or image, from the imager 718. In some examples, an image processor 730 is used for processing the image to identify regions of interest, for example, each region of interest containing a particle, or group of particles of the same type. The image processor 730 then processes the regions of interest to determine particle identity, and determines which regions of interest hold particles of target types. The image processor 730 then assigns counts to the regions of interest based, at least in part, on the distance between the region of interest and the microfluidic ejector. The image processor 730 may use any number of computational systems to identify the regions of interest in the particle types. For example, the methods discussed with respect to FIGS. 12-16 may be implemented by the image processor 730.

A stage motion controller 732 directs the motor controller 720 to move the stage translator 722. In some examples, the motor controller 720 is used to move a capture well on a multiwell plate under a microfluidic ejector to capture a droplet holding a target particle based, at least in part, on whether a count of a particle ejected indicates that the next particle to be ejected is of a target type. The motor controller 720 is also used to move a waste container under a microfluidic ejector to capture droplets that do not include a target particle.

An MEC firing controller 734 uses the MEC interface 712 to direct a microfluidic ejector controller 714 to sequentially fire microfluidic ejectors, while counting the particles ejected during the firing. In various examples, the value of the count is used to capture a target particle or send a non-target particle to a waste container.

The batch sorting procedure is not limited to moving a stage to capture target particles. In some examples, the ejection of a droplet from a microfluidic ejector may be combined with high voltage fields for steering the droplet, for example using dielectrophoresis or electrophoresis, to direct a droplet holding a particle towards a collection vessel.

Figure 8:
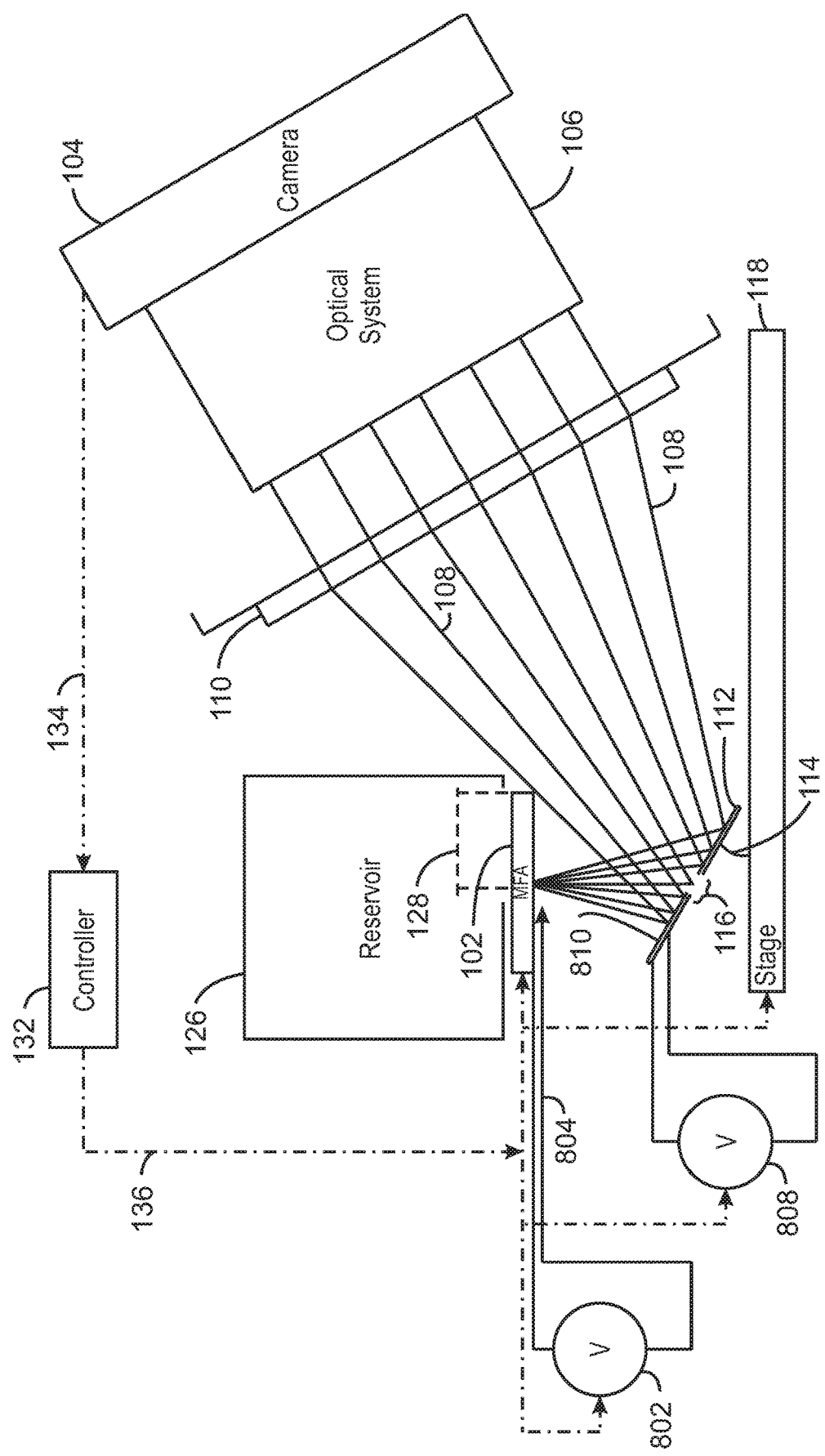
FIG. 8 is a drawing of a batch particle-sorting system that combines microfluidic ejectors with droplet charging systems to steer the droplets, in accordance with examples.

FIG. 8 is a drawing of a batch particle-sorting system 800 that combines microfluidic ejectors with droplet charging systems to steer the droplets, in accordance with examples. Like numbered items are as described with respect to FIG. 1. In the batch particle-sorting system 800 of FIG. 8, the lighting is not shown. However, the batch particle-sorting system 800 may use the light source 122 of FIG. 1, the co-linear light source of FIG. 3, or any other number of other light sources.

A droplet charging system 802, or power supply, uses an electrode 804 to impose an electric charge on a droplet as it is ejected from a microfluidic ejector on the die 102. The droplet charging system 802 may use a fixed voltage, such as 500 V, 1000 V, 1500 V, or higher, depending on the breakdown voltage in the vicinity of the electrode 804, and the steering voltages used to aim the droplet.

A steering system 808, which is also a power supply, applies high-voltage fields to electrodes placed near the path of the droplets as they move from the microfluidic ejector on the die 102 to a collection vessel on the stage 118. In an example, electrodes 810 are formed into the annular mirror 112 to steer the droplets as they passed through the opening 116 in the annular mirror. In other examples, the electrodes are plates disposed below the annular mirror 112.

Figure 9:
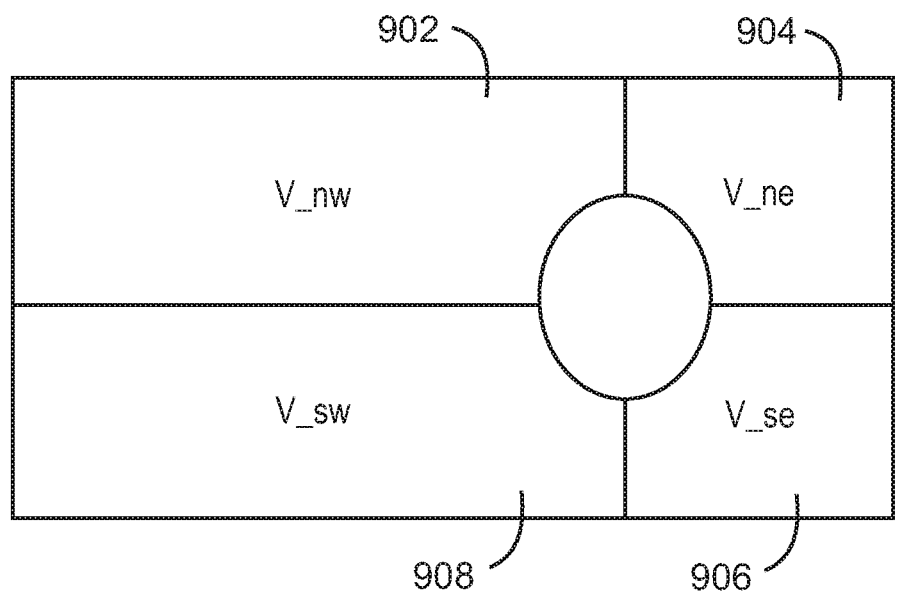
FIG. 9 is a drawing of a mirror that includes high-voltage electrodes for steering droplets, in accordance with examples.

FIG. 9 is a drawing of a mirror 900 that includes high-voltage electrodes 902-908 for steering droplets, in accordance with examples. In the example, the mirror 900 has four electrodes which may have independently applied voltages to steer the droplet. In this example, a positively charged droplet passing through the opening is pulled towards negatively charged electrodes and pushed away from positively charged electrodes. As an example, if the droplet is charged by a positive 500 V electrode after leaving the microfluidic ejector, charging electrode V_nw 902 to 1500 V positive, and electrode V_se 906 to 500 V negative may steer the droplet in the general direction of V_se 906, for example, into a collection vessel underneath V_se 906.

In some examples, steering a droplet may be combined with the movable stage to select a collection vessel for different types of particles, such as cells. For example, the stage may be moved to different groups of collection vessels, wherein the specific collection vessel for a particle is determined by the droplet steering voltages. This may improve the ability of the batch sorting system to quickly sort multiple particle types, based on the count of the particles ejected.

Figure 10:
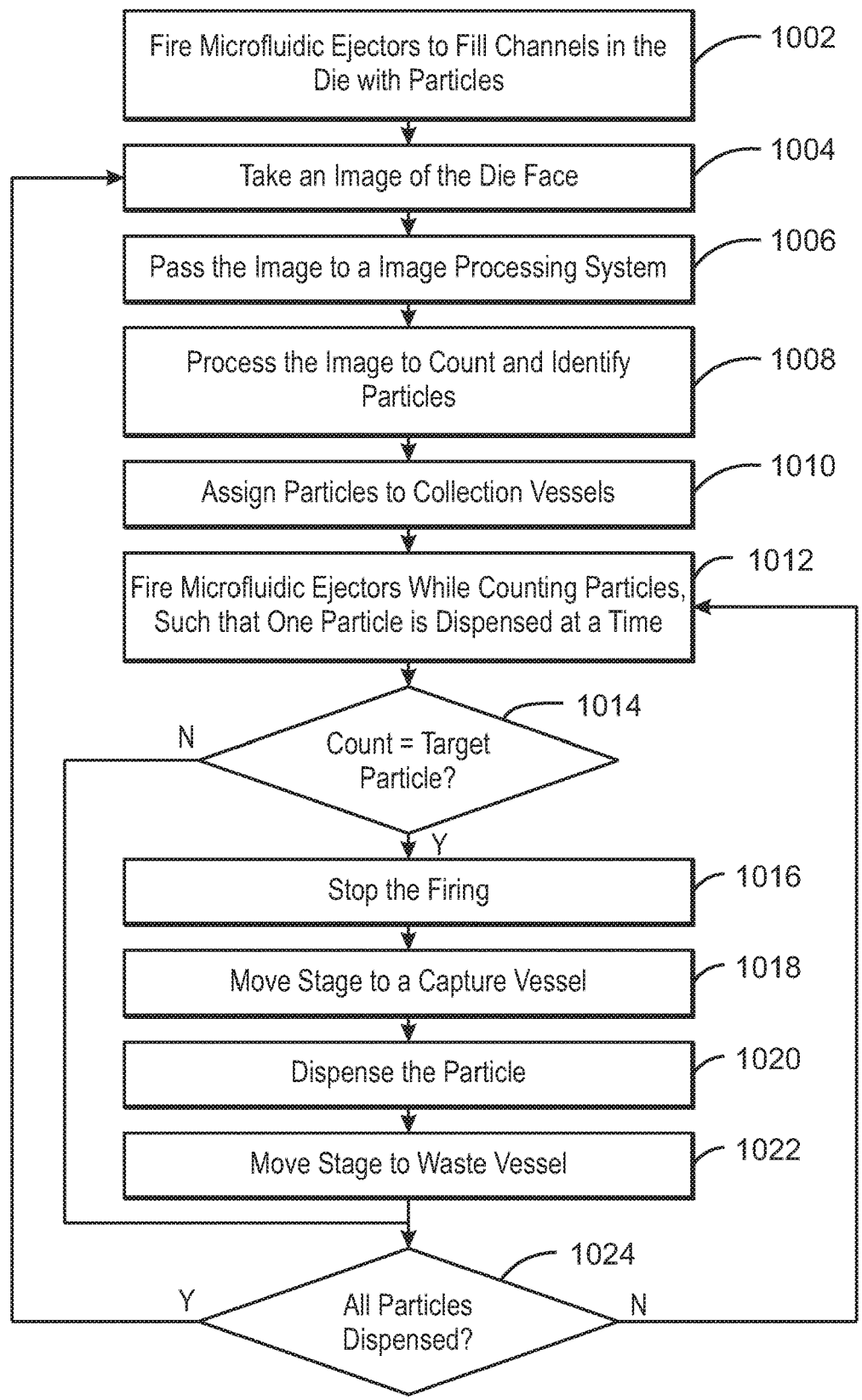
FIG. 10 is a process flow diagram of a method for using image processing to sort batches of particles using a die that includes multiple microfluidic ejectors, in accordance with examples.
Figure 11:
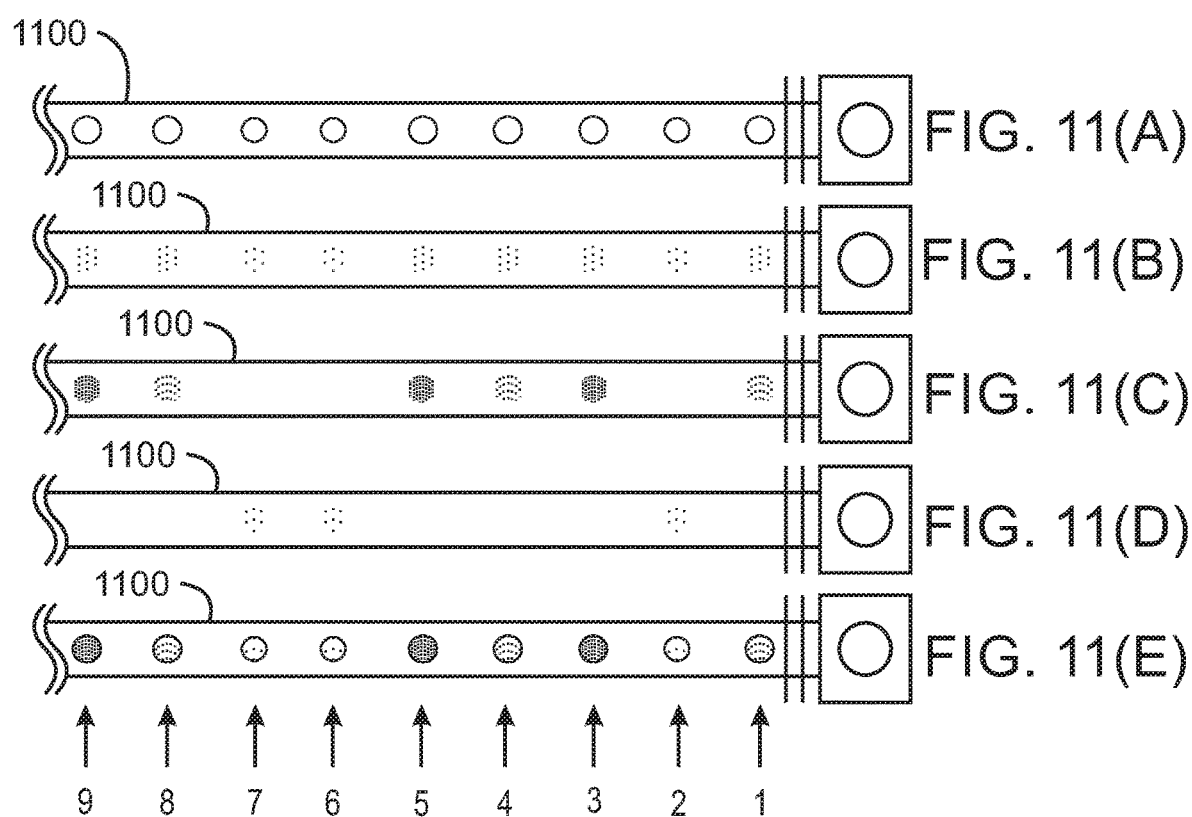
FIGS. 11(A) through (E) are drawings of a portion of a flow channel that includes nine cells that are imaged after staining with fluorescent dyes, in accordance with examples.

FIG. 10 is a process flow diagram of a method 1000 for using image processing to sort batches of particles using a die that includes multiple microfluidic ejectors, in accordance with examples. The method 1000 may be implemented by the controller 132 described with respect to the previous figures. As noted herein, the particles may be cells. The method begins at block 1002, when the microfluidic ejectors are sequentially fired to fill flow channels in the die with particles. The Coulter counter may be used to determine when the flow channels are filled with particles, as the counter begins to count particles.

At block 1004, an image is taken of the die face. This may be performed using the imaging systems described with respect to FIG. 1, 3, 5, or 6, among others. At block 1006, the image is passed on to an image processing system, for example, in the controller 132, or in a network connected system coupled to the controller through a NIC 724 (FIG. 7).

At block 1008 the image is processed to determine regions of interest, identify particles in the regions of interest, and assign a count to the regions of interest. This may be performed by the controller 132, or a network connected system, which uses the methods discussed with respect to FIGS. 12-16. These methods may include analysis of spectral vectors, wherein the spectral response at each of a number of wavelength ranges is used to identify particular type of cell. In other examples, a neural network may be trained to recognize both regions of interest and cell types based on image response at a number of different wavelengths, including visible images, emission spectra, and the like. At block 1010, particles of target types are assigned to collection vessels. The target type may be a single type using a single collection vessel, or multiple types using multiple collection vessels, depending on the assay being performed.

At block 1012, the microfluidic ejectors of the die are fired sequentially, while counting particles that have been dispensed. This may be performed in such a way that one particle is dispensed in a single droplet. However, if multiple particle sizes are included, such as large target cells mixed with much smaller red blood cells, groups or clusters of the red blood cells may be ejected in single droplets and counted as a single region of interest.

At block 1014, the count is compared to the previously assigned counts to determine if a target particle is about to be ejected. If so, at block 1016, the sequential firing is halted. At block 1018, the x-y stage is moved to move a capture vessel under a microfluidic ejector on the die. At block 1020, the microfluidic ejector for the target particle is fired to dispense the particle into the capture vessel. At block 1022, the x-y stage is moved to return a waste vessel to a location underneath the microfluidic ejector. In some examples, a check may be made to determine if the count indicates that the next particle to be dispensed is also a target particle. If so, the particle may be dispensed before the x-y stage moves the waste vessel back into location underneath the microfluidic ejector.

If at block 1014, it is determined that no target particle is about to be ejected, or if the stage has been moved back to the waste vessel at block 1022, a determination is made as to whether all particles in the count have been dispensed. If not, process flow returns to block 1012 to continue with sequentially firing the microfluidic ejectors.

If, at block 1024, it is determined that all particles in the current count have been dispensed, process flow returns to block 1004. At block 1004, a new image is taken of the die face, and the method 1000 repeats.

FIGS. 11(A) through (E) are drawings of a portion 1100 of a flow channel that includes nine cells that are imaged after staining with fluorescent dyes, in accordance with examples. FIG. 11(A) is a visible image of the cells showing that some of the cells, such as cells 2, 6, and 7, have a different size than the other cells. The size of the cells may be used to determine if the cells are a target type, such as a white blood cell, a cancer cell, or other cell of interest. However, without further features, size alone may not provide a distinguishing characteristic. In this example, cells 1, 3-5, 8, and 9 are of similar size. Accordingly, the cells may be imaged after staining with various fluorescent dyes to further distinguish the cells by the use of the fluorescent spectra.

FIG. 11(B) is an image of the cells stained with 4',6-diamidino-1-phenylindole (DAPI), which strongly binds to adenine-thymine rich regions in DNA. Generally, the dye is used to stain lysed cells, but the die does diffuse into living cells, albeit at a slow rate.

FIG. 11(C) is an image of the cells stained with a cytokeratin (CK) stain which reacts with water-insoluble intra-cytoplasmic structural proteins. These proteins are the dominant proteins of epithelial and hair forming cells. The proteins are also found in epithelial tumors, or carcinomas. Accordingly, the second dye may highlight epithelial tumor cells. Other cells that may be highlighted by a CK stain include cells from carcinomas, carcinoid tumors, epithelial tissue, and the like. The CK stain may be useful in differentiating a sarcomatoid carcinoma from a sarcoma. In a sarcomatoid carcinoma, malignant cells have properties of both epithelial tumors and mesenchymal tumors ("sarcoma").

FIG. 11(D) is an image of the cells stained with a CD45 stain. The CD45 stain, or CD45 antibody staining, reacts with alloantigens and all isoforms of the CD45 leukocyte common antigen (LCA). The CD45 protein is a transmembrane glycoprotein is expressed at high levels on a cell surface. Its presence distinguishes leukocytes, or white blood cells, from non-hematopoietic cells, such as lung cells, bone cells, cartilage cells, or fat cells, among others.

FIG. 11(E) is an aggregate of the images collected by the imaging system that includes the visible image of the cells, and the fluorescence images of the stained cells. A lookup table may be generated that includes the amounts and wavelengths that a target cell will fluoresce due to each of the stains added to the material. The individual entry for a cell in the lookup table may be termed a spectral vector. The spectral vector may be combined with the cell size and texture information from the visible image to identify the cell. In some examples, the spectral vector is used with a machine learning technique, such as a support vector machine (SVM). This may improve the accuracy of the cell identification during the cell sorting procedure. Other techniques may be used to identify the cells, such as neural networks trained to recognize both regions of interest and cell types.

It can be noted that the techniques described herein are not limited to cells. As mentioned, any number of other particles may be sorted in a batch process using the techniques and systems described herein. In various examples, the particles are formed from fluorescent inorganic materials, such as cadmium sulfide spheres, wherein the size of the spheres controls the emission wavelength, and may be used for sorting the spheres.

Figure 12:
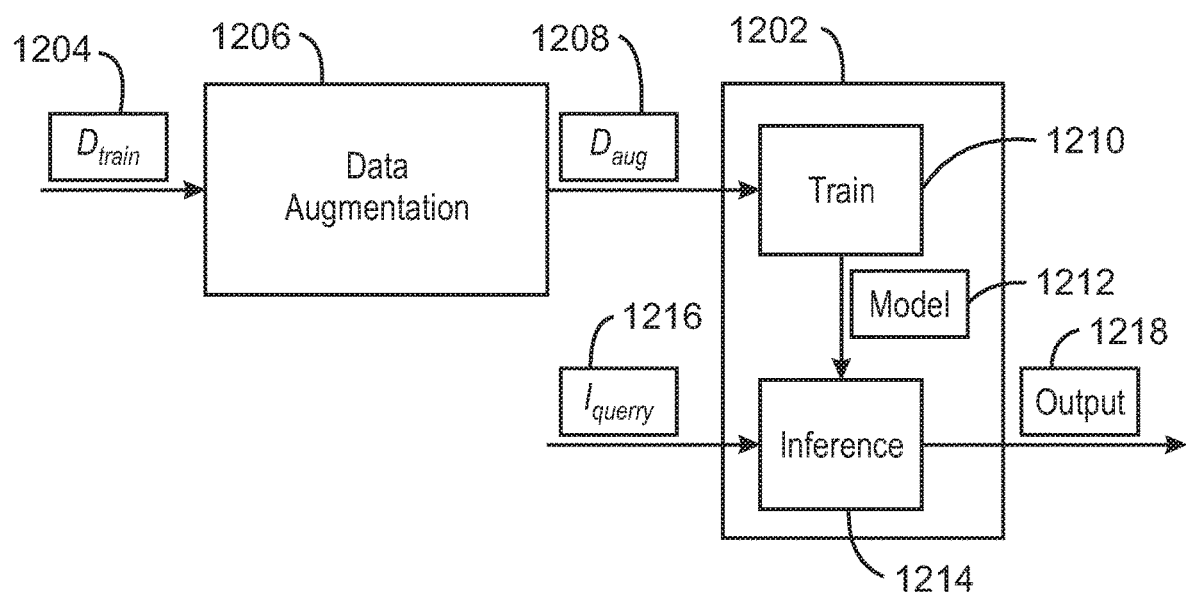
FIG. 12 is a schematic diagram of a process for training and using a convolutional neural network (CNN) to identify regions of interest and particles in the regions of interest, in accordance with examples.

FIG. 12 is a schematic diagram of a process 1200 for training and using a convolutional neural network (CNN) 1202 to identify regions of interest and particles in the regions of interest, in accordance with examples. In the process 1200, labeled training data sets 1204, which are images with the ground truth, are used to train the neural network 1202. As used herein, the ground truth indicates that the locations (regions of interest), and the type of the particles in the image are labeled and identified. The features of the particles may then be used to train the localization and classification model. In some examples, the models are used for classification identities only. In these examples, the ground truth indicates that the particles in the image are labeled and identified. The features of the particles may then be used to train the classification model. The feature extraction can be a manual identification of features of particles, or features learned from the training data.

A data augmentation procedure 1206 is used to boost the number of training data sets, and also introduce reasonable variations, for example, to make the identifications more robust. This may be performed by applying some transformations on the original training data set, such as rotation, flipping, or cropping, among others. The data augmentation procedure 1206 generates an augmented data set 1208 that is provided to a training procedure 1210 in the CNN 1202.

The training procedure 1210 generates a model 1212. The model 1212 is used by an inference engine 1214 to perform the identifications described herein. This is performed when a query image 1216 is processed by the inference engine 1214 to generate an output 1218. The output 1218 includes regions of interest, for example, in the form of bounding boxes that indicates portions of the image containing particles. Further, the output 1218 assigns identifications of the particles in each of the bounding boxes. The bounding boxes are sequentially numbered starting at the nozzle of the microfluidic ejector.

The choice of feature extraction classification method depends on particle types, and the systems capabilities of data acquisition, including speed, resolution, signal-to-noise ratio, and the like, and computation power, including GPUs, FPGAs, or other dedicated hardware. Examples of morphological features that may be used to identify specific cells may include size, shape, color, the mission intensity, spatial distribution, and the like.

Any number of convolutional neural networks and training techniques that are known in the art may be used herein to locate and classify particles. For example, if the location of the region of interest (ROI) is known, leaving just the object classification, a typical convolutional neural network model may be used. In this model, the ROI is defined in the input image, and passed through multiple convolution stages for feature selection. At each convolution stage, a number of convolution kernels may be applied to the image, such as image filtering and feature selection. After feature selection, the classification procedure through multiple neural network layers may identify the type of the feature, for example, particle or cell, in the image. At the end of the neural network layers in normalized exponential function may be executed to further classify the type of the feature. This may result in a probability vector that, for each class, indicates that the target object belongs in the class. The class with the highest probability is the output.

In the techniques discussed with respect to the batch sorting process, however, simultaneous identification of the region of interest and the classification of the particles in the region of interest is implemented. In this procedure, a deep learning model may be used. A number of models have been developed to solve this problem, which tend to infer localization and classification at the same time. A trade-off between performance and real-time prediction determines the model to be selected.

Examples of these types of models include YOLO (you only look once, Faster R-CNN, SSD, Mask R-CNN, or RetinaNet, among others. The first model, YOLO) uses a single neural network to predict bounding boxes, for regions of interest, and class probabilities, for particle types. See You Only Look Once: Unified, Real-Time Object Detection, Redmon, J.; Divvala, S.; Girshick, R; and Farhadi, A., at https://pjreddie.com/media/files/papers/yolo.pdf (last accessed on Sep. 10, 2018); see also YOLOv2: An Incremental Improvement, Redmon, J; Farhadi, A, at https://pkeddie.com/media/files/papers/YOLOv3.pdf (last accessed on Sep. 10, 2018). The other models mentioned are similarly accessible.

Figure 13:
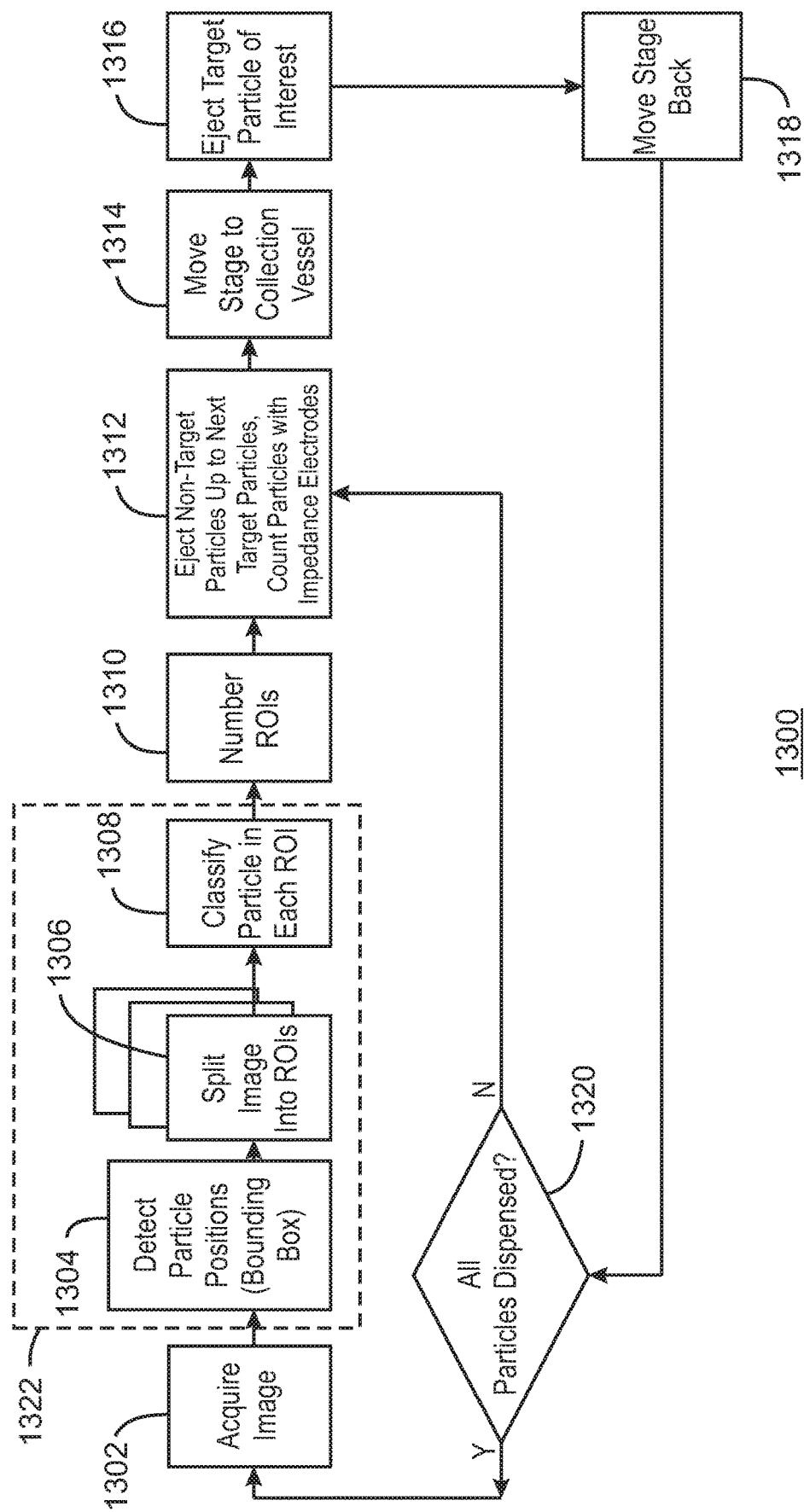
FIG. 13 is a schematic diagram of a procedure for batch particle sorting, in accordance with examples.

FIG. 13 is a schematic diagram of a procedure 1300 for batch particle sorting, in accordance with examples. The procedure 1300 begins at block 1302, when an image is acquired of the die face including particles in the flow channels. As described herein, the image may be obtained using a visible light camera, multiple CCD imaging systems, or both.

At block 1304, the particle positions, or bounding boxes, are detected. At block 1306, the image is split into regions of interest (ROIs). Depending on the size of the die face, there may be 100 ROIs, 500 ROIs, 1000 ROIs, or more. At block 1308, the type of particle in each ROI is determined or classified. At block 1310, the particles are numbered. In some examples, the ROIs are numbered, as multiple small particles may appear as a cluster in a single ROI, such as red blood cells.

At block 1312, the microfluidic ejectors are fired to eject non-target particles into a waste vessel, while counting particles with the impedance electrodes of the Coulter counter. When the count indicates that a target particle has been reached, the firing is paused.

At block 1314, the x-y stage is moved to position a collection vessel under the microfluidic ejector holding the target particle. At block 1316, the microfluidic ejector holding the target particle is fired to eject the target particle into the collection vessel. At block 1318, the x-y stage is moved to position the waste vessel under the microfluidic ejectors. As described herein, in some examples, a determination is made as to whether the next particle in a sequence is also a target particle before the x-y stage is moved to reposition the waste vessel under the microfluidic ejectors.

At block 1320, a determination is made as to whether all particles have been dispensed. This is performed by comparing the current count to the total count assigned in block 1310. If not, process flow returns to block 1312 to continue the batch sorting process.

If, at block 1320, the determination indicates that all particles in the current count have been dispensed, process flow returns to block 1302. At block 1302, a new image may be acquired to sort another batch of particles, or the procedure 1300 may end. In this procedure 1300, a single neural network model 1322 may be used to implement the procedures described with respect to blocks 1304, 1306, and 1308.

Figure 14:
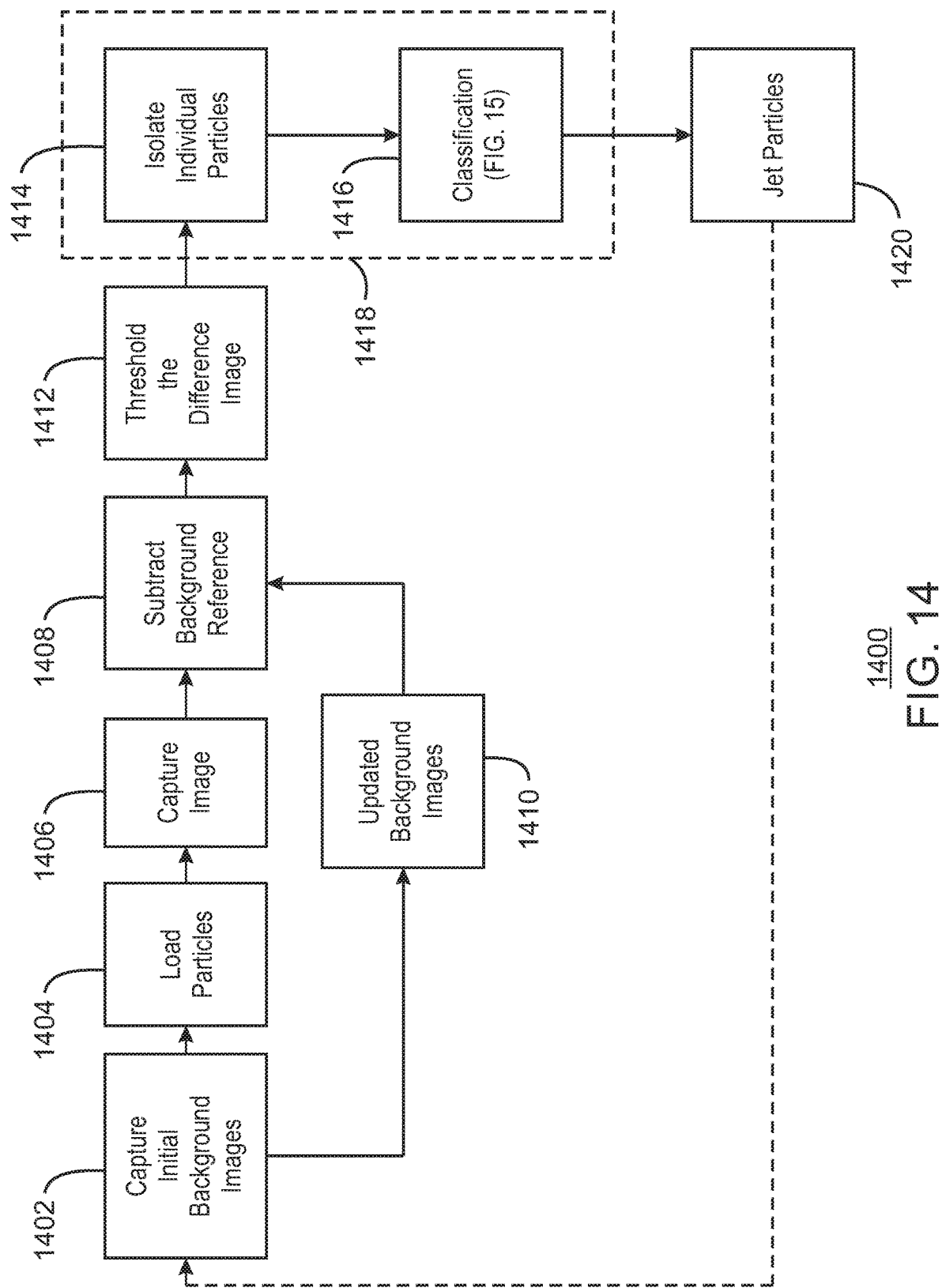
FIG. 14 is a block diagram of a procedure that is used to sort particles in batches, in accordance with examples.
Figure 15:
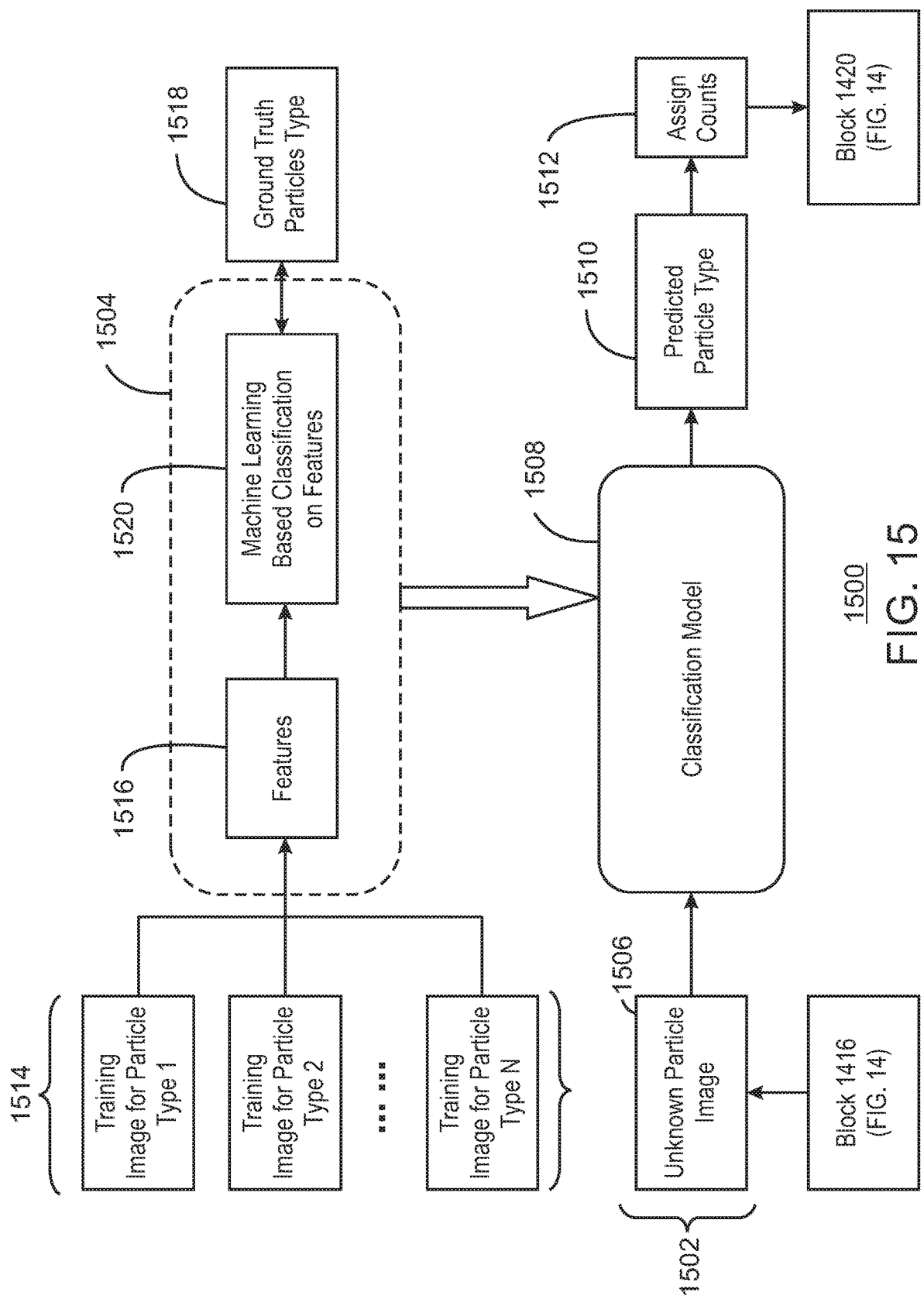
FIG. 15 is a block diagram of a procedure for using and training a model to classify particles, such as cells, in accordance with examples.

FIGS. 14 and 15 are more detailed schematic diagrams for the batch sorting process and the training process. FIG. 14 is a block diagram of a procedure 1400 that is used to sort particles in batches, in accordance with examples. The procedure 1500 shown in FIG. 15 is used to classify and count the individual particles.

The procedure 1400 begins at block 1402, with the collection of an initial background image or images. The background image is used to compensate for changes in the background. For example, changes in the flow channels may occur if debris or other material sticks in a flow channel.

At block 1404, particles are loaded into the flow channels of the die, for example, by sequentially firing the microfluidic ejectors. At block 1406, an image is captured of the die, for example, with the flow channels full of particles from the reservoir up to the nozzle of the microfluidic ejectors. At block 1408, the background reference 1410 is subtracted from the captured image to create a difference image. At block 1412, the difference image may be processed with a threshold to get a mask of the foreground particles.

At block 1414, the foreground mask may be used to isolate individual particles in the image. The locations of the individual particles may then be classified at block 1416, as described with respect to FIG. 15. In some examples, the isolation of individual particles and the classification of the particles may be performed using a single neural network procedure 1418, as described with respect to FIGS. 12, 13, and 16.

At block 1420, the particles are sequentially jetted from the microfluidic ejectors while ejected cells are counted. When the count indicates that a target particle is in a nozzle for a microfluidic ejector, a collection vessel is moved underneath the microfluidic ejector to capture the target particle. The jetting continues until all particles in the count are exhausted. At that point, process flow returns to block 1402 to repeat sorting for the next batch. In some examples, process flow ends after block 1420.

FIG. 15 is a block diagram of a procedure 1500 for using 1502 and training 1504 a model to classify particles, such as cells, in accordance with examples. Using 1502 the model to classify particles begins at block 1506, when an unknown cell image is provided to a classification model 1508, for example, from block 1416 of FIG. 14. In the classification model 1508, a technique is used to identify the most probable cell type. This may be implemented by a neural network, a support vector machine (SVM), or a simpler technique, such as a lookup table for spectral vectors. This provides a predicted cell type 1510. At block 1512, counts are assigned to the particles. Process flow then returns to block 1420 of FIG. 14.

The training 1504 of the classification model 1508 is performed by obtaining training images 1514 of the different particle types to be recognized. Features 1516 are extracted from the training images for each of the particle types that distinguish the particle types from other particle types. As described with respect to FIG. 12, the features 1516 may include particle sizes, emission spectra for the particles, correlation of emission spectra to dyes used to stain the, and the like. A ground truth identification 1518 of each particle type and the features 1516 may be used by machine learning base classification system 1520, which may explicitly or implicitly correlate the features 1516 to the ground truth identification 1518. In some examples, the explicit correlation is a spectral vector for each particle type, saved to a lookup table. In some examples, the implicit correlation includes weighting factors between nodes in a neural network model. The explicit or implicit correlation is then used as the classification model 1508 for identifying the particle types.

Figure 16:
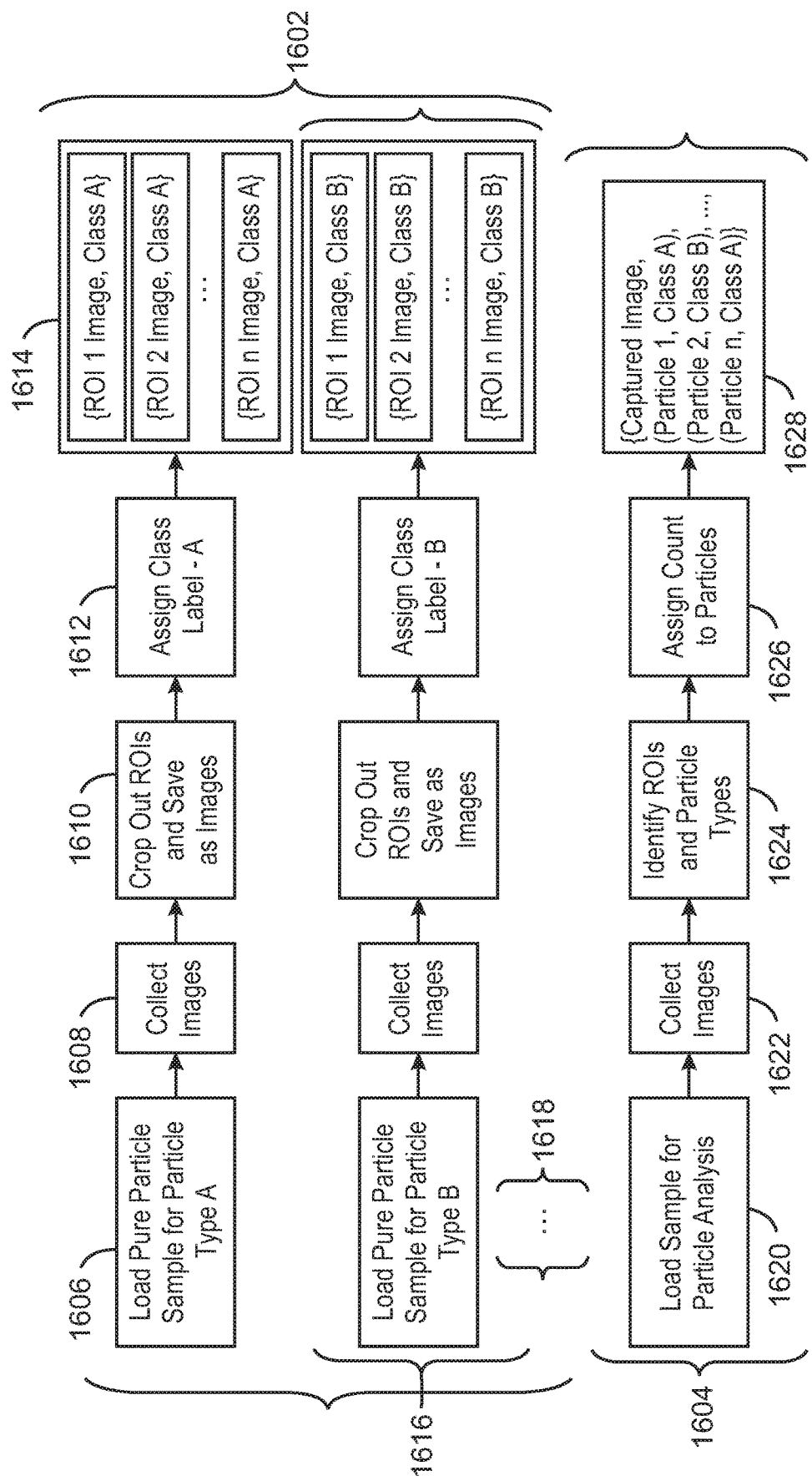
FIG. 16 is a schematic diagram of procedures for training and using a convolutional neural network to simultaneously identify regions of interest and classify particles in the regions of interest, in accordance with examples.

FIG. 16 is a schematic diagram of procedures for training 1602 and using 1604 a convolutional neural network to simultaneously identify regions of interest and classify particles in the regions of interest, in accordance with examples. These procedures may be used with the convolutional neural networks such as YOLO or RetinaNET, among others, which are described with respect to FIG. 12.

The training 1602 begins at block 1606, when a sample including a first particle type is loaded into the batch sorting system. At block 1608, images are collected of the die with the first particle type loaded. At block 1610, regions of interest are manually cropped and saved as images. At block 1612, a class label is assigned to the first particle type. The resulting images 1614 are saved for use in training the neural network.

The training 1602 is repeated 1616 for another particle type generating another set of training images. Further training is performed 1618 for each of the successive particle types that may be used. The images are then used in a training procedure for the convolutional neural network to train for both the recognition of regions of interest and of particle types.

Using 1604 the convolutional neural network starts at block 1620, with loading of samples for particle analysis. At block 1622, images are collected of the die with the particle analysis sample loaded. At block 1624, the trained CNN is used to identify both regions of interest and particle types. At block 1626, counts are assigned to each particle, for example, starting at the particle nearest the nozzle of the microfluidic ejector. While the microfluidic ejectors are being sequentially activated, the list of the identifications of the particles 1628, and their counts, is used to determine which particles to capture in a collection vessel.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the scope of the present techniques.

What is claimed is:

1. A sorting system for batch sorting of particles, comprising:
   a microfluidic ejector;
   a flow channel fluidically coupled to the microfluidic ejector at one end;
   a reservoir coupled to an opposite end of the flow channel from the microfluidic ejector;
   a counter disposed in the flow channel upstream of the microfluidic ejector to count particles prior to ejection from the microfluidic ejector;
   an optical sensor to image the flow channel; and
   a controller configured to:
     locate a target particle in the flow channel based, at least in part, on the image; and
     capture the target particle in a collection vessel based, at least in part, on a count from the counter.

2. The sorting system of claim 1, wherein the reservoir comprises a fluid solution comprising the particles.

3. The sorting system of claim 1, comprising:
   a droplet charging system to impose an electric charge on the droplet ejected from the microfluidic ejector; and
   electrodes proximate to the optical sensor coupled to a power supply, comprising an electrical field to steer the droplet to a target location.

4. The sorting system of claim 1, wherein the microfluidic ejector comprises a thermal resistor.

5. The sorting system of claim 1, wherein each of the microfluidic ejector comprises a piezoelectric cell.

6. The sorting system of claim 1, wherein the optical sensor comprises:
   a mirror comprising an opening to allow ejected droplets to pass through into the collection vessel; and
   a camera focused on the flow channel through the mirror.

7. The sorting system of claim 1, wherein the optical sensor comprises a fluorimeter.

8. The sorting system of claim 1, wherein the optical sensor comprises a particle size analyzer.

9. The sorting system of claim 1, wherein the optical sensor comprises an image recognition system.

10. The sorting system of claim 1, wherein the collection vessel comprises a multi-well plate mounted to an x-y stage.

11. A method for the batch sorting of particles, comprising:
- capturing an image of a flow channel comprising a line of particles, wherein the flow channel is coupled to a microfluidic ejector;
- processing the image to identify the particles in the flow channel;
- assigning each of the particles in the flow channel a number based, at least in part, on a location of each of the particles in the flow channel;
- firing the microfluidic ejector to eject particles while counting the particles that have been ejected;
- determining that the count of a particle in the microfluidic ejector corresponds to a target particle, and, in response to determining:
  - moving a collection vessel into place under the microfluidic ejector; and
  - firing the microfluidic ejector to eject the target particle into the collection vessel.

12. The method of claim 11, comprising:
- determining that the count does not correspond to the target particle; and
- firing the microfluidic ejector to eject the particle into a waste vessel.

13. The method of claim 11, wherein processing the image comprises determining a cell identification using image recognition.

14. The method of claim 11, wherein processing the image comprises determining fluorescent spectra of cells in the image.

15. The method of claim 11, comprising steering a droplet comprising the particle into a target container using dielectrophoresis.

* * * * *